(12) United States Patent
Large et al.

(10) Patent No.: US 8,665,244 B2
(45) Date of Patent: Mar. 4, 2014

(54) OPTICAL TOUCH DETECTION

(75) Inventors: Timothy Large, Bellevue, WA (US);
Neil Emerton, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 241 days.

(21) Appl. No.: 13/032,378

(22) Filed: Feb. 22, 2011

(65) Prior Publication Data

US 2012/0212451 A1 Aug. 23, 2012

(51) Int. Cl.
*G06F 3/042* (2006.01)
*G06F 3/041* (2006.01)
*G06F 3/045* (2006.01)

(52) U.S. Cl.
USPC .......................... 345/175; 345/173; 345/174

(58) Field of Classification Search
USPC ........................................................ 345/175
See application file for complete search history.

(56) References Cited

U.S. PATENT DOCUMENTS

| | | | |
|---|---|---|---|
| 6,480,187 B1 | 11/2002 | Sano et al. | |
| 6,788,295 B1 | 9/2004 | Inkster | |
| 2002/0061178 A1* | 5/2002 | Winston et al. | 385/133 |
| 2003/0072080 A1* | 4/2003 | Ariyoshi et al. | 359/487 |
| 2006/0161871 A1* | 7/2006 | Hotelling et al. | 715/863 |
| 2007/0064444 A1 | 3/2007 | Kim et al. | |
| 2008/0121442 A1 | 5/2008 | Boer et al. | |
| 2008/0284925 A1* | 11/2008 | Han | 349/12 |
| 2009/0002344 A1 | 1/2009 | Wilson et al. | |
| 2009/0128499 A1 | 5/2009 | Izadi et al. | |
| 2009/0231281 A1* | 9/2009 | Whytock et al. | 345/168 |
| 2010/0103140 A1 | 4/2010 | Hansson | |
| 2010/0117989 A1* | 5/2010 | Chang | 345/175 |
| 2010/0238138 A1 | 9/2010 | Goertz et al. | |
| 2011/0032214 A1 | 2/2011 | Gruhlke et al. | |

OTHER PUBLICATIONS

Takamatsu, et al., "Transparent conductive-polymer strain sensors for touch input sheets of flexible displays", Retrieved at << http://iopscience.iop.org/0960-1317/20/7/075017/pdf/0960-1317_20_7_075017.pdf >>, Journal of Micromechanics and Microengineering, Jun. 7, 2010, pp. 7.

Yeliussizov, et al., "Multi-touch sensing using frustrated total internal reflection", Retrieved at << http://ieeexplore.ieee.org/stamp/stamp.jsp?arnumber=05372574 >>, IEEE Conference Publishing, 2009, pp. 4.

"Touching the future", Retrieved at << http://www.economist.com/node/11999181?story_id=11999181 >>, Sep. 4, 2008, pp. 4.

(Continued)

*Primary Examiner* — Alexander S Beck
*Assistant Examiner* — Mihir Rayan
(74) *Attorney, Agent, or Firm* — Jeremy Snodgrass; Glen Johnson; Micky Minhas

(57) ABSTRACT

Optical touch detection is provided by an interactive display device including an elastomer layer, a reflector configured to transmit light having a first characteristic and to reflect light having a second characteristic, and a display positioned to output modulated light having the first characteristic through the elastomer layer and the reflector as a display image. The interactive display device further comprises a test light source positioned to output light having the second characteristic through the elastomer layer for reflection off of the reflector, and a sensor configured to receive light having the second characteristic reflected from the reflector.

20 Claims, 8 Drawing Sheets

(56) References Cited

OTHER PUBLICATIONS

Izadi, et al., "C-Slate: A multi-touch and object recognition system for remote collaboration using horizontal surfaces", Retrieved at << http://research.microsoft.com/pubs/132551/cslatel.pdf >>, Second Annual IEEE International Workshop on Horizontal Interactive Human-Computer System, 2007, p. 3-10.

Powell, et al., "Variable Light Diffusion in Interactive Display Device", U.S. Appl. No. 12/949,416, filed Nov. 18, 2010, 34 Pages.

"International Search Report", Mailed Date: Aug. 12, 2013, Application No. PCT/US2012/025326, Filed Date: Feb. 16, 2012, 11 Pages.

* cited by examiner

OPTICAL TOUCH DETECTION

BACKGROUND

Interactive display devices may utilize various types of touch detection technology for detecting touch inputs, such as detecting electrical capacitance, detecting electrical resistance, optically detecting touches, etc. For the case of optical detection, such systems may utilize a vision system including a camera and a light source (e.g., an infrared source) to capture an image of a touch surface. However, such systems may be power-intensive.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

According to one aspect of this disclosure, an interactive display device is provided. The interactive display device includes an elastomer layer, a reflector configured to transmit light having a first characteristic and to reflect light having a second characteristic, and a display positioned to output modulated light having the first characteristic through the elastomer layer and the reflector as a display image. The interactive display device further comprises a test light source positioned to output light having the second characteristic through the elastomer layer for reflection off of the reflector, and a sensor configured to receive light having the second characteristic reflected from the reflector.

DETAILED DESCRIPTION

Figure 1:
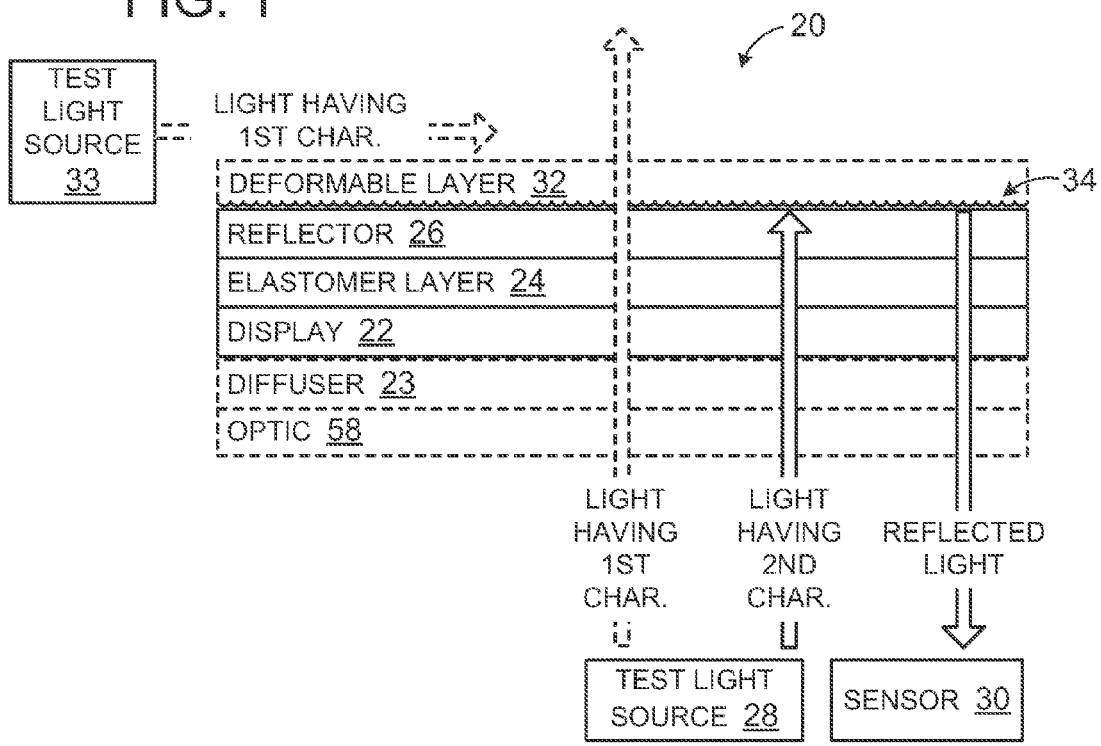
FIG. 1 shows an example interactive display device in accordance with an embodiment of the present disclosure.

Embodiments are disclosed herein that relate to a low-power interactive display device including an optical system configured for touch detection and vision analysis, which may be further configured for imaging beyond the surface of the device. Optical touch detection allows for vision analysis to be performed for recognizing objects (e.g., tags, outlines, etc.), recognizing user touches (e.g., finger and/or stylus touching a display surface), and recognizing user hovers (e.g., finger and/or stylus held above a display surface).

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included herein are schematic and generally not drawn to scale. Rather, the various drawing scales, aspect ratios, and numbers of components shown in the figures may be purposely distorted to make certain features or relationships easier to see.

FIG. 1 schematically shows an example interactive display device 20 in accordance with an embodiment of the present disclosure. It should be appreciated that FIG. 1 is for illustrative purposes, and is not drawn to scale. Interactive display device 20 includes a display configured to output modulated light having a first characteristic so as to visually present display images. The first characteristic may correspond to any suitable property or properties of light. As a nonlimiting example, the first characteristic may be a range of wavelengths (e.g., 400-840 nm). Thus, light having the first characteristic may include visible light, for example.

The display may be any suitable display. In some embodiments, a display 22 may be utilized, such as a semi-transparent organic light emitting diode (OLED) display (e.g., a self-emissive OLED flat panel display). As another suitable example, display 22 may be a liquid crystal display (LCD). A diffuser 23 positioned adjacent to the LCD may be utilized to define an image plane and viewing angle in the LCD (e.g., so as to form the display images). Further, in some embodiments, light having the first characteristic may be generated by a backlight (not shown) of the display 22.

In other embodiments, interactive display device 20 may utilize another suitable display, such as a projection display (not illustrated). For the case of a rear projection display, a diffuser may be utilized as a projection screen for displaying projected images, as well as a diffuser to define an image plane and viewing angle. As yet another suitable example, a front projection display may be utilized.

The display (e.g., display 22) may be positioned so as to output the modulated light having the first characteristic through an elastomer layer 24 and a reflector 26 as a display image. Elastomer layer 24 may be any suitable material that is deformable, elastic, and sufficiently transparent to light having the first characteristic. Examples include, but are not limited to, vinyl rubbers, silicone elastomers, polyurethane elastomers, etc. Further, elastomer layer 24 may be sufficiently thin (e.g., on the order of a few millimeters) while still allowing for deformations.

Reflector 26 is configured to transmit light having the first characteristic (e.g., modulated light output by display 22, light generated by a backlight of display 22, etc.) and to reflect light having a second characteristic. The second characteristic may be any suitable property or properties of light, such as a range of different wavelengths than that of the first characteristic (e.g., ~940 nm). As a nonlimiting example, light having the second characteristic may include infrared light. Accordingly, reflector 26 may be a dichroic reflector configured to transmit light within a first range of wavelengths and to reflect light within a different range of wavelengths. Reflector 26 may be of any suitable configuration including, but not limited to, polyester having a vacuum-deposited reflector layer.

Since reflector 26 reflects light having a different characteristic than that output by display 22, reflector 26 and elastomer layer 24 may, in some embodiments, be positioned over display 22 without adversely affecting the display of images. Further, in some embodiments, elastomer layer 24 may be bonded to display 22, resulting in low first surface reflections.

Interactive display device 20 may further include a test light source 28 and a sensor 30. Test light source 28 may be positioned to output light having the second characteristic through elastomer layer 24 for reflection off of reflector 26. Test light source 28 may be any suitable source of light having the second characteristic, such as a light-emitting diode (LED), laser, etc. Accordingly, sensor 30 may be configured to receive light having the second characteristic reflected from reflector 26. Sensor 30 may be any suitable image capture device, such as a camera. Further, in some embodiments, test light source 28 and a shutter of sensor 30 may be synchronously pulsed.

For the case of interactive display device 20 including a display positioned between test light source 28 and elastomer layer 24, such as display 22, such a display may be sufficiently transparent to light having the second characteristic, so as not to interfere with touch detection via test light source 28 and sensor 30.

Further, for the case of display 22 utilizing a diffuser 23, such a diffuser may be configured to have a significant specular component associated with light having the second characteristic. For example, for the case that light having the second characteristic corresponds to infrared light, diffuser 23 may have a specular component in the infrared because the wavelength is longer compared to the scattering feature size (e.g., infrared bleed). As such, the diffuser 23 may be configured so as not to inhibit touch detection via test light source 28 and sensor 30.

Test light source 28 may be utilized to illuminate reflector 26 with light having the second characteristic, and sensor 30 may then receive light having the second characteristic that is reflected off of the reflector 26. Test light source 28 and sensor 30 may be positioned in any suitable way (e.g., adjacent and in a same plane) so as to capture a pattern of light having the second characteristic reflected from reflector 26. Interactive display device 20 may then be further configured to interpret the pattern of light having the second characteristic received by sensor 30 as a touch input deforming reflector 26.

More specifically, when reflector 26 is locally distorted by a touch input or inputs from a finger, hand, object, pen, etc. pressing on a surface of interactive display device 20, the light distribution (e.g., pattern of light) returning to sensor 30 changes, and the touch may be detected. In this way, interactive display device 20 is configured to provide optical touch detection.

In some embodiments, interactive display device 20 may be configured such that reflector 26 provides the interactive surface for receiving touch inputs. In such cases, a force applied by each touch input locally deforms a corresponding region of reflector 26. As such, light having the second characteristic received from test light source 28 reflects differently at the deformed region of reflector 26 than when such a region is not deformed.

However, in other embodiments, interactive display device 20 may be configured such that another layer provides the interactive surface for receiving touch inputs. Such a layer may be utilized to enhance the sensitivity for detecting touch inputs, for example. As an example, interactive display device 20 may include a deformable layer 32 for receiving touch inputs, which includes a plurality of bumps 34. Each bump 34 may be configured to, responsive to a touch input, contact and locally deform a corresponding region of reflector 26. Each bump may be relatively small in comparison to a typical touch input from a finger, for example. Thus, a touch input may result in each of several of bumps 34 contacting and locally deforming reflector 26. In this way, the bumps may enhance how light having the second characteristic reflects from reflector 26 responsive to touch inputs.

It should be appreciated that such a deformable layer 32 may be configured in any suitable manner. As a nonlimiting example, deformable layer 32 may include any suitable material such as glass, plastic, etc. with a replicated structure on the front and/or back of the layer, for example. Further, bumps 34 may be configured in any suitable way so as to enhance how light having the second characteristic reflects from reflector 26 responsive to touch inputs. As a nonlimiting example, each of bumps 34 may be on the order of 100 micrometers wide, and on the order of a few millimeters in pitch. Further, in some embodiments, bumps 34 may be optically matched (e.g., index matched using a fluid or gel) with deformable layer 32.

Additionally or alternatively, in some embodiments the sensitivity to touch inputs may be enhanced by modifying the elastomer properties of elastomer layer 24 to give a larger deflection per unit force applied. As such, reflector 26 may then deform relatively more per unit force applied, thus enhancing how light reflects from reflector 26 responsive to touch inputs.

Figure 2:
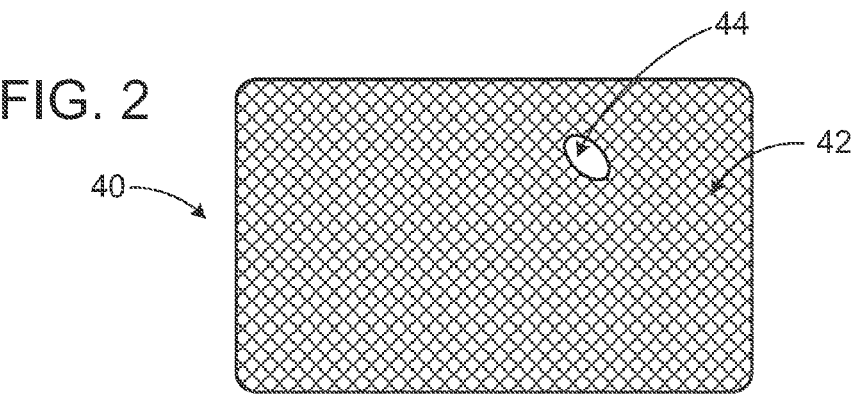
FIG. 2 shows an example pattern of light for dark field detection in accordance with an embodiment of the present disclosure.

Interactive display device 20 may be configured to capture any suitable pattern of light of the second characteristic for interpreting to touch inputs, such as patterns based on dark field detection or bright field detection, for example. For the case of dark field detection, light having the second characteristic received from region(s) of reflector 26 deformed by the touch input or inputs may be directed to (e.g., focused at) sensor 30, whereas light having the second characteristic received from region(s) of reflector 26 not deformed by the touch input or inputs may be directed to a location proximal to sensor 30 (e.g., focused to miss the sensor). Thus, sensor 30 captures a "dark field" for regions not deformed by touch input as the light reflected from such regions is directed proximal to the sensor. However, light reflected from regions deformed by touch inputs is directed to the sensor, and thus is captured as a pattern of light that appears as a bright portion in the pattern with respect to the dark field. FIG. 2 illustrates an example light pattern 40 having a dark field 42 with respect to a portion 44 associated with a touch input.

Figure 3:
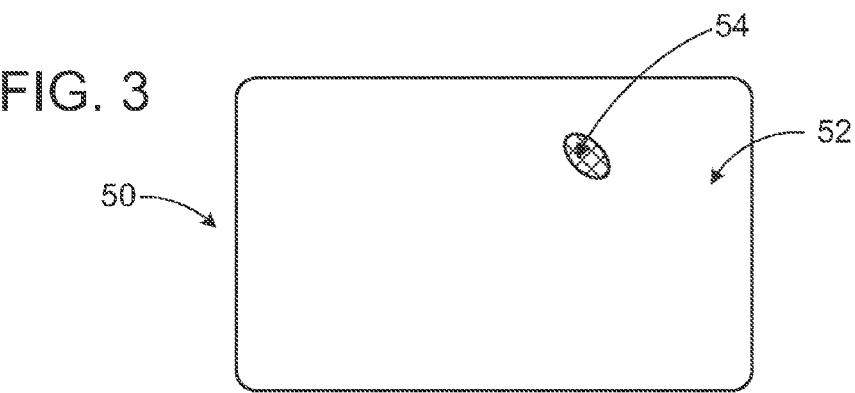
FIG. 3 shows an example pattern of light for bright field detection in accordance with an embodiment of the present disclosure.

Alternatively, for the case of bright field detection, light having the second characteristic received from region(s) of reflector 26 deformed by the touch input or inputs may be scattered (e.g., scattered from sensor 30), whereas light having the second characteristic received from region(s) of reflector 26 not deformed by the touch input may be directed to (e.g., focused at) sensor 30. Thus, for bright field detection, sensor 30 captures a "bright field" for regions not deformed by touch input as the light reflected from such regions is directed to the sensor. However, light reflected from regions deformed by touch input is scattered from the sensor, and thus appears as a dark portion in the pattern with respect to the bright field. FIG. 3 illustrates an example light pattern 50 having a bright field 52 with respect to a portion 54 associated with a touch input.

It should be appreciated that the regions associated with the touch input as illustrated at portion 44 and 54 are nonlimiting.

Such a portion or portions may be of any suitable shape, size, etc. For example, for the case of interactive display device 20 including a front projection display, interactive display device 20 may be configured so as to capture a pattern of light having a "halo" image around the portion associated with the touch input.

It should also be appreciated that the position and alignment of test light source 28 and/or sensor 30 may be utilized to capture such patterns of light. Further, in some embodiments, interactive display device 20 may be configured to utilize one or more optics for capturing the pattern of light.

For example, interactive display device 20 may include a collimating optic 58 for illuminating reflector 26 with light having the second characteristic. Such a collimating optic may be positioned so as to collimate light having the second characteristic received from test light source 28 and direct collimated light having the second characteristic toward reflector 26. In this way, the reflector may be uniformly illuminated. Any suitable collimating optic may be utilized including, but not limited to, a collimating lens, a Fresnel lens, an optical wedge, etc., as described by way of example hereafter.

Figure 4:
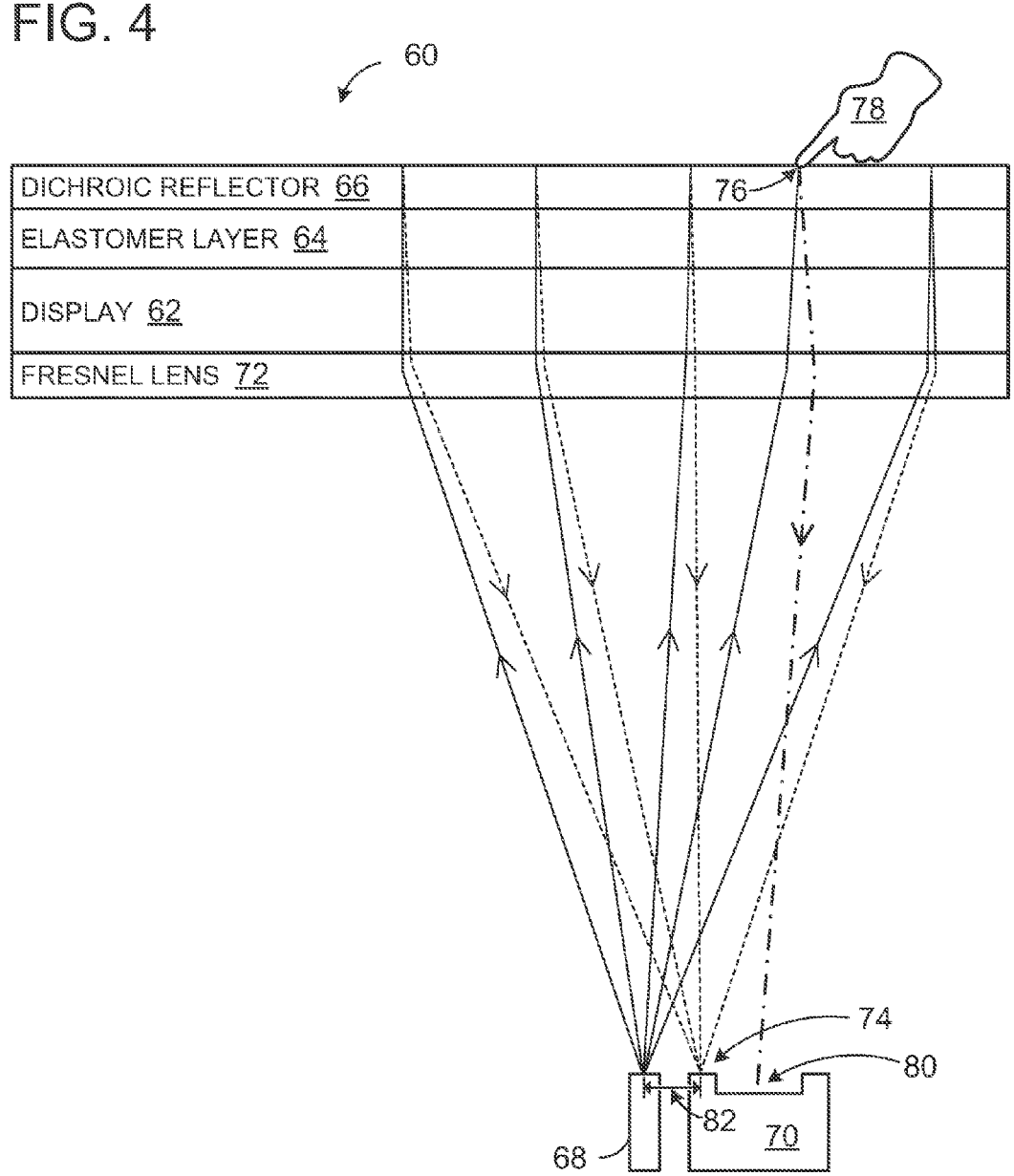
FIG. 4 schematically shows an example of optical touch detection on an interactive display device in accordance with an embodiment of the present disclosure.

FIG. 4 schematically shows an example interactive display device 60 including a display 62, elastomer layer 64, reflector 66, test light source 68 and sensor 70. Interactive display device 60 further includes a Fresnel lens 72 configured to receive diverging light having the second characteristic from test light source 68, and collimate the light for illuminating reflector 66. Fresnel lens 72 is further configured to refocus light having the second characteristic (e.g., light that is reflected from reflector 66). For the case of the depicted example, interactive display device 60 is configured for dark field detection, wherein Fresnel lens 72 refocuses light received from regions of reflector 66 not deformed responsive to touch inputs at a location proximal to an aperture of sensor 70, as indicated at 74. Alternatively, light reflected from regions of reflector 66 deformed responsive to touch inputs, such as example region 76 deformed by a touch input of user 78, are focused at the aperture of sensor 70, as indicated at 80. It should be appreciated that FIG. 4 is illustrative, and not drawn to scale. It should be further appreciated that while FIG. 4 depicts interactive display device 60 configured for dark field detection, bright field detection may alternatively be utilized.

It should be further appreciated that a Fresnel lens is just one of many suitable collimating optics. For example, an optical wedge may be utilized, thus allowing for a thinner form factor for the interactive display device.

Figure 5:
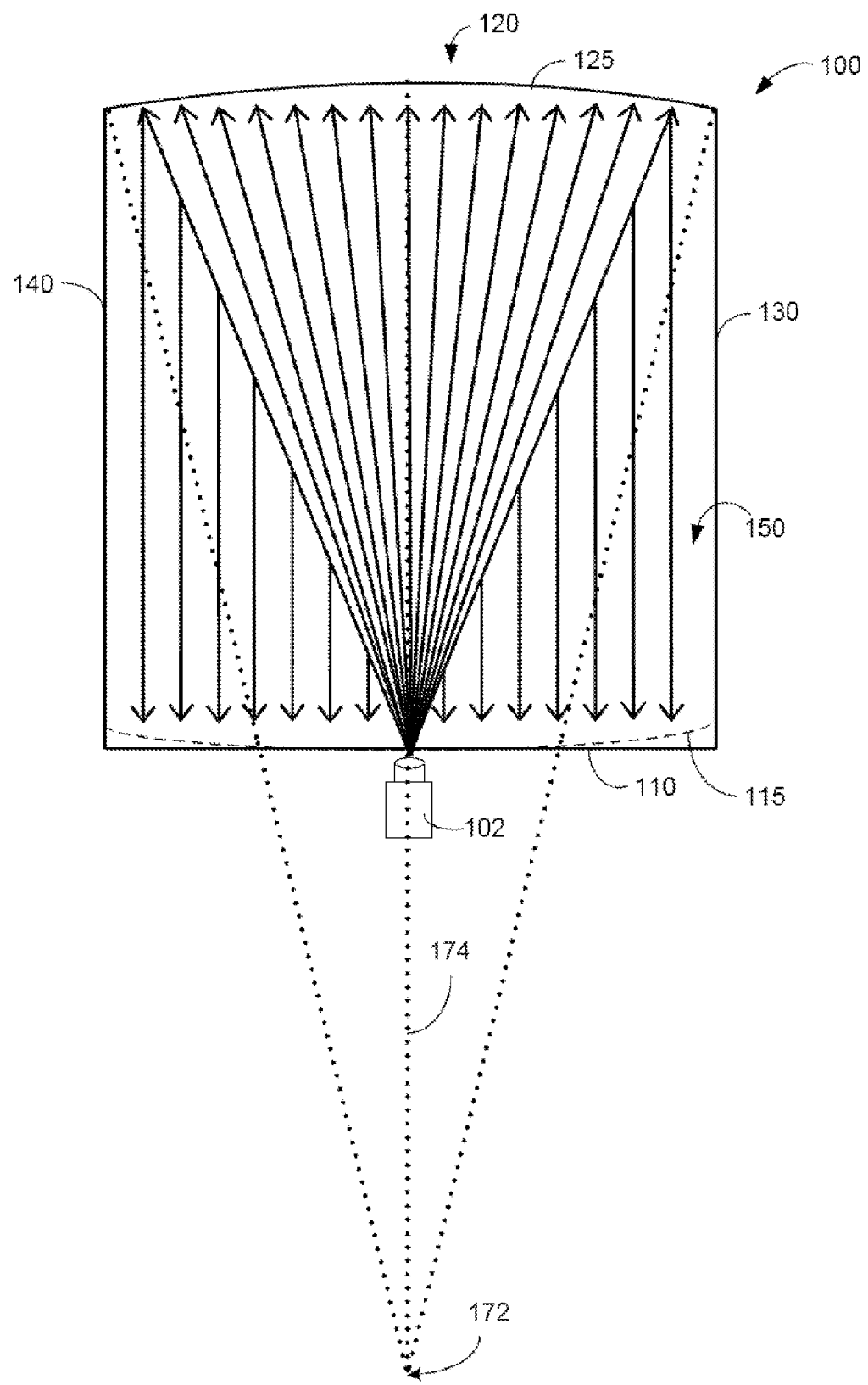
FIG. 5 shows a schematic, plan view showing an embodiment of an optical wedge in accordance with an embodiment of the present disclosure.

FIG. 5 shows an example optical wedge 100 that may be configured to collimate light (e.g., light having the second characteristic) from an example light source 102 disposed adjacent to a thin end 110 of optical wedge 100, such that collimated light exits viewing surface 150 of optical wedge 100, as shown by the ray traces in FIG. 5. The term "viewing surface" indicates that viewing surface 150 is closer to a viewer than a back surface (not visible in FIG. 5) which is opposite of viewing surface 150. Each of the viewing and back surfaces is bounded by sides 130 and 140, thin end 110, and thick end 120. In FIG. 5, viewing surface 150 faces a viewer of the page and the back surface is hidden by this view of optical wedge 100.

Optical wedge 100 is configured such that light rays injected into a light interface of thin end 110 may fan out as they approach thick end 120 comprising end reflector 125. The light rays are delivered to end reflector 125 via total internal reflection from viewing surface 150 and the back surface. In the preferred embodiment, end reflector 125 is curved with a uniform radius of curvature having center of curvature 172, and light source 102 injecting light at the focal point of end reflector 125, the focal point being at one half the radius of curvature. At thick end 120, each of the light rays reflects off of end reflector 125 parallel to each of the other light rays. The light rays travel from thick end 120 toward thin end 110 until the light rays intersect viewing surface 150 at a critical angle of reflection of viewing surface 150 and the light rays exit as collimated light. Likewise, optical wedge 100 may also receive light (e.g., light having the second characteristic that is reflected off of the reflector responsive to a touch input) at the viewing surface. In such a case, the received light rays are then delivered to a sensor located proximal to light source 102, for example. In an alternative embodiment, end reflector 125 may be parabolic or have other suitable curvature for collimating light.

In other embodiments, a plurality of light sources may be disposed adjacent to and along thin end 110. The use of a plurality of light sources may increase the brightness of the collimated light exiting viewing surface 150 compared to the use of a single light source. In such embodiments, to correct for field curvature and/or spherical aberration, it may be desirable to slightly shorten sides 130 and 140 of optical wedge 100 so that a light source to either side of center line 174 may stay in the focal point of end reflector 125. Shortening sides 130 and 140 may make thin end 110 convex, as illustrated by curve 115. A suitable curvature may be found by using a ray-tracing algorithm to trace rays at a critical angle of reflection of viewing surface 150 of optical wedge 100 back through optical wedge 100 until the rays come to a focus near thin end 110.

Figure 6:
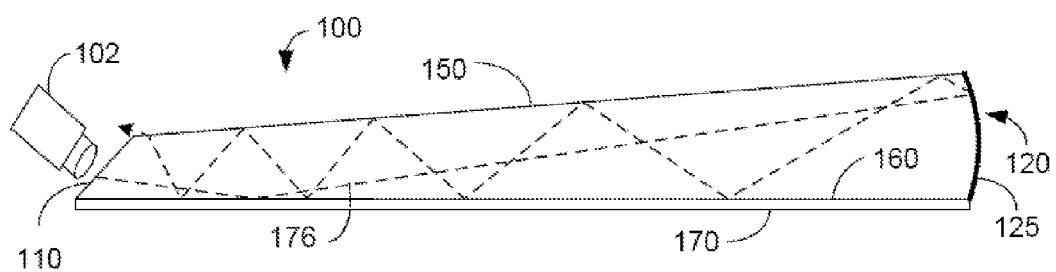
FIGS. 6 and 7 show ray traces through a sectional view of the embodiment of FIG. 5.
Figure 7:
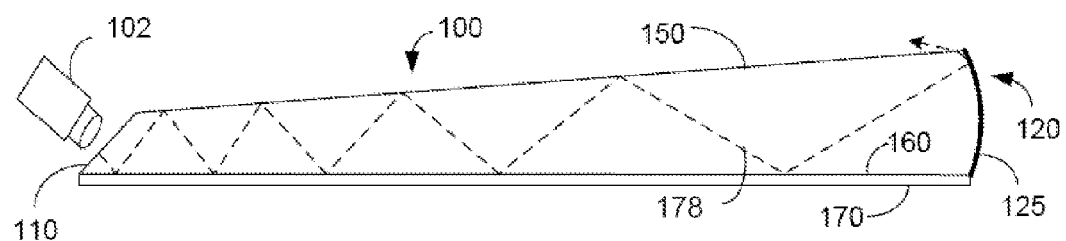

FIGS. 6 and 7 show ray traces through a schematic cross-sectional view of optical wedge 100. FIG. 6 shows the path of a first ray 176 through optical wedge 100, and FIG. 7 shows the path of a second ray 178 through optical wedge 100, wherein rays 176 and 178 represent rays located at opposite sides of a cone of light that is input into thin end 110 of optical wedge 100. As can be seen in FIGS. 6 and 7, ray 176 exits viewing surface 150 adjacent to thin end 110 of optical wedge 100, while ray 178 exits viewing surface 150 adjacent to thick end 120 of optical wedge 100.

Rays 176 and 178 exit viewing surface 150 once the rays 176 and 178 intersect viewing surface 150 at an angle less than or equal to a critical angle of internal reflection with respect to a normal of viewing surface 150. This critical angle may be referred to herein as the "first critical angle." Likewise, rays reflect internally in optical wedge 100 when the rays intersect viewing surface 150 at an angle greater than the first critical angle of internal reflection with respect to the normal of viewing surface 150. Further, rays reflect internally in optical wedge 100 when the rays intersect back surface 160 at an angle greater than a critical angle of internal reflection with respect to the normal of back surface 160. This critical angle may be referred to herein as the "second critical angle."

It may be desirable for the first critical angle and the second critical angle to be different, such that light incident on back surface 160 at the first critical angle is reflected back toward viewing surface 150. This may help to prevent loss of light through the back surface 160, and therefore may increase the optical efficiency of the optical wedge 100. The first critical angle is a function of the refractive index of optical wedge 100 and the index of refraction of the material interfacing viewing surface 150 (e.g. air or a layer of a cladding), while the second critical angle is a function of the refractive index of optical wedge 100 and the material adjacent to back surface 160. In some embodiments, such as that shown in FIGS. 6-7, a layer of cladding 170 may be applied only to back surface 160, such that viewing surface 150 interfaces with air. In other embodiments, viewing surface 150 may comprise a layer of cladding (not shown) with a different refractive index than back surface 160.

Any suitable material or materials may be used as cladding layers to achieve desired critical angles of internal reflection for the viewing and/or back surfaces of an optical wedge. In an example embodiment, optical wedge 100 is formed from polymethyl methacrylate, or PMMA, with an index of refraction of 1.492. The index of refraction of air is approximately 1.000. As such, the critical angle of a surface with no cladding is approximately 42.1 degrees. Next, an example cladding layer may comprise Teflon AF (EI DuPont de Nemours & Co. of Wilmington, Del.), an amorphous fluoropolymer with an index of refraction of 1.33. The critical angle of a PMMA surface clad with Teflon AF is 63.0 degrees. It will be understood that these examples are described for the purpose of illustration, and are not intended to be limiting in any manner.

In other embodiments, back surface 160 may include a mirror. As non-limiting examples, the mirror may be formed by applying a reflective coating to back surface 160 or by placing a mirror adjacent to back surface 160. In this manner, back surface 160 may reflect incident light intersecting back surface 160. When back surface 160 is configured to reflect some or all incident light, back surface 160 may be referred to herein as the "reflective back surface." Non-limiting examples of a reflective back surface include a back surface having a mirrored surface, a mirror placed adjacent to the back surface, a back surface having a second critical angle of internal reflection with respect to a normal of the back surface, wherein the second critical angle of reflection is less than the first critical angle of reflection, or any other configuration in which the back surface is reflective to internally incident light at the first critical angle of internal reflection.

The configuration of optical wedge 100 and end reflector 125 may be configured to cause a majority of viewing surface 150 to be uniformly illuminated when uniform light is injected into thin end 110, and also to cause a majority of the injected light to exit viewing surface 150. As mentioned above, optical wedge 100 is tapered along its length such that rays injected at thin end 110 travel to end reflector 125 via total internal reflection. End reflector 125 comprises a faceted lens structure configured to decrease the ray angle relative to a normal to each of viewing surface 150 and back surface 160. In addition, the diminishing thickness of optical wedge 100 from thick end 120 to thin end 110 causes ray angles to diminish relative to the normal of each surface as rays travel toward thin end 110. When a ray is incident on viewing surface 150 at less than the first critical angle, the ray will exit viewing surface 150.

In some embodiments, light source 102 may be positioned at a focal point of end reflector 125. In such embodiments, end reflector 125 may be curved with a radius of curvature that is twice the length of optical wedge 100. In the embodiment of FIGS. 6-7, the taper angle of optical wedge 100 is configured so that the corner at thick end 120 and viewing surface 150 comprises a right angle and the corner at thick end 120 and back surface 160 comprises a right angle. When thin end 110 is at the focal point of end reflector 125, thin end 110 is one half the thickness of thick end 120. In other embodiments, each of these structures may have any other suitable configuration.

In the depicted embodiment, end reflector 125 is spherically curved from side 130 to side 140 and from viewing surface 150 to back surface 160. In other embodiments, end reflector 125 may be cylindrically curved with a uniform radius of curvature from viewing surface 150 and back surface 160 and a center of curvature where viewing surface 150 and back surface 160 would meet if extended. A cylindrically curved end reflector may resist sag more strongly than a spherically curved end reflector 125, which may be beneficial in large format applications. Other suitable curvatures may be used for end reflector 125, such as parabolic, for example. Additionally, the curvature of end reflector 125 in the plane perpendicular to sides 130 and 140 may differ from the curvature of end reflector 125 in the plane parallel to sides 130 and 140.

It should be appreciated that FIGS. 5-7 are nonlimiting. In other embodiments, a differently configured optical wedge may be utilized. For example, instead of utilizing the above-described optical wedge, having folded optics with an end reflector, an optical wedge having continuous optics may be utilized in some embodiments. Such optical wedges having continuous optics may be easier to manufacture than the above-mentioned wedges utilizing folded optics.

Figure 8:
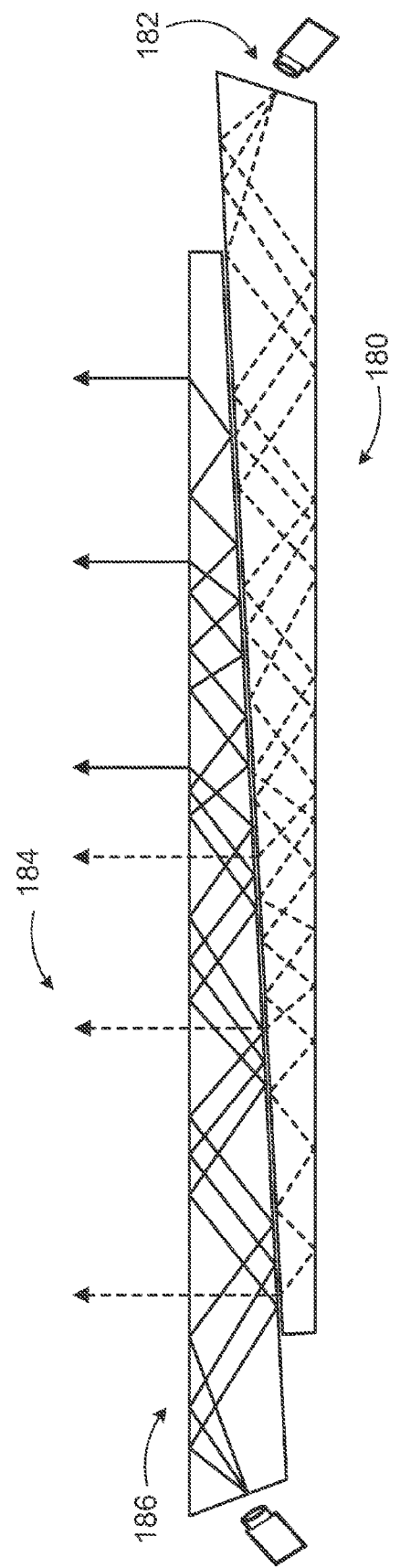
FIG. 8 shows another example optical wedge in accordance with an embodiment of the present disclosure.

FIG. 8 illustrates an example optical wedge 180 having continuous optics. Light rays (e.g., associated with light having the second characteristic) enter at the thick end of optical wedge 180, as indicated at 182, and travel from the thick end toward the thin end until the light rays intersect the viewing surface at a subcritical angle of incidence, and exit the wedge as collimated light, as indicated at 184.

Due to the wedge geometry, light rays exit as collimated light over the narrower part of such an optical wedge. Thus, optical wedge 180 may be stacked with another optical wedge 186 in order to illuminate the entire surface of the reflector for detection of touch inputs. The optical wedges may be positioned "nose to tail" (e.g., thin end of optical wedge 180 may be positioned adjacent the thick end of optical wedge 186).

Optical wedge 180 may also receive light (e.g., light having the second characteristic that is reflected off of the reflector responsive to a touch input) at the viewing surface. In such a case, the received light rays may then be delivered to a sensor located proximal to the light source, for example. In the illustrated stacked configuration, optical wedge 180 is positioned so as to look through the non-imaging region of optical wedge 186.

Continuing with the interactive display device (e.g., interactive display device 20 of FIG. 1), it should be appreciated that the power utilized for such a device is relatively low in comparison to traditional vision systems. This is because most of the optical power launched by test light source 28 is returned via reflection off of reflector 26, with little light escaping the system. This is in contrast to traditional vision systems which typically utilize a larger amount of optical power that is mostly lost to the outside world, and just a small fraction of the light reflected back into the system (e.g., by a finger) typically enters the sensor. Further, such a low illumination power allows for interactive display device 20 to be a mobile device, in some examples.

In some embodiments, interactive display device 20 may be further configured to image beyond the surface of interactive display device 20, for detection of user hovers, and/or features of the user such as the user's hand, arm, etc. In such embodiments, the interactive display device may be configured to perform such imaging beyond the surface with light having the first characteristic, so as not to interfere with detection via light having the second characteristic.

For example, light having the first characteristic may include light having wavelengths within a range up to 880 nm, and light having the second characteristic may include light having wavelengths within a range around 940 nm. As such, light having the first characteristic may include visible light utilized for display 22, as well as infrared light ~840 nm utilized for detection beyond the surface which is distinct from infrared light ~940 nm utilized for touch detection at the surface. Since reflector 26 transmits light having the first characteristic, reflector 26 is configured so as not to interfere with imaging beyond the surface. As a nonlimiting example, reflector 26 may be reflective at ~940 nm but transmissive at ~840-400 nm. In this way, the interactive display device may be configured to operate at a single, or narrow range of wavelengths for light having the second characteristic (e.g., by using a narrow band reflector design) which does not affect the imaging through the display at other wavelengths associated with light having the first characteristic, thereby allowing functions such as scanning and hover at other wavelengths.

For the case of display 22 utilizing a diffuser 23, the infrared bleed may not be sufficient for transmission of the light utilized for imaging beyond the surface (e.g., ~840 nm light). In such a case, a switchable diffuser may be utilized so as not to interfere with imaging beyond the surface. Such a switchable diffuser may be configured to be switched off during image capture beyond the surface. Such detection is described in more detail with reference to FIG. 10.

The switchable diffuser may be configured in any suitable way. For example, a polymer-dispersed liquid crystal (PDLC) or polymer-network liquid crystal (PNLC) switchable diffuser sheet may be driven, electronically, between a more diffusing state and a less diffusing (e.g., non-diffusing) state, with intermediate states in between. Imaging through the vision system with the diffuser in the more diffusing state enables visible light to be imaged for display 22, while imaging in the less diffusing state enables the vision system to see through display 22 and beyond the touch surface. Accordingly, switching between more diffusing and less diffusing states for subsequent and/or alternating frames in a prescribed pattern allows the vision system to frame-grab touch-pressure input data as well as input images from objects above the exterior surface.

In some embodiments, an external test light source 33 may be utilized for outputting light having the first characteristic that is utilized for detection beyond the surface (e.g., ~840 nm light). As a nonlimiting example, external test light source 33 may include LEDs positioned around the edge of interactive display device 20. In some embodiments, sensor 30 may be utilized for capturing light having the first characteristic, as well as light having the second characteristic. However, in other embodiments, different sensors may be utilized without departing from the scope of this disclosure. Time-multiplexing may be employed to alternate between image capture beyond the surface, and image capture for touch detection, as described in more detail with reference to FIG. 10.

In some embodiments, interactive display device 20 may be further configured to reduce interaction from external influences by matching a notch filter at reflector 26 to a narrow band filter at sensor 30. In this way, interactive display device 20 may be configured for a relatively higher sensitivity for input touches, and a relatively lower sensitivity for external events such as near touches, cuffs, shadows, ambient light, etc. As such, interactive display device 20 may provide high ambient rejection.

Further, in embodiments including an LCD display utilizing a backlight, LEDs backlighting the LCD may be positioned next to sensor 30 and test light source 28. As such, the light for backlighting the LCD may follow a same path as the test light (e.g., as illustrated in FIG. 4). This allows for increased efficiency over traditional systems, in that the components may be utilized for multiple functions.

It should be further appreciated that the interactive display device may include additional or alternative components not illustrated in FIG. 1 without departing from the scope of this disclosure.

Figure 9:
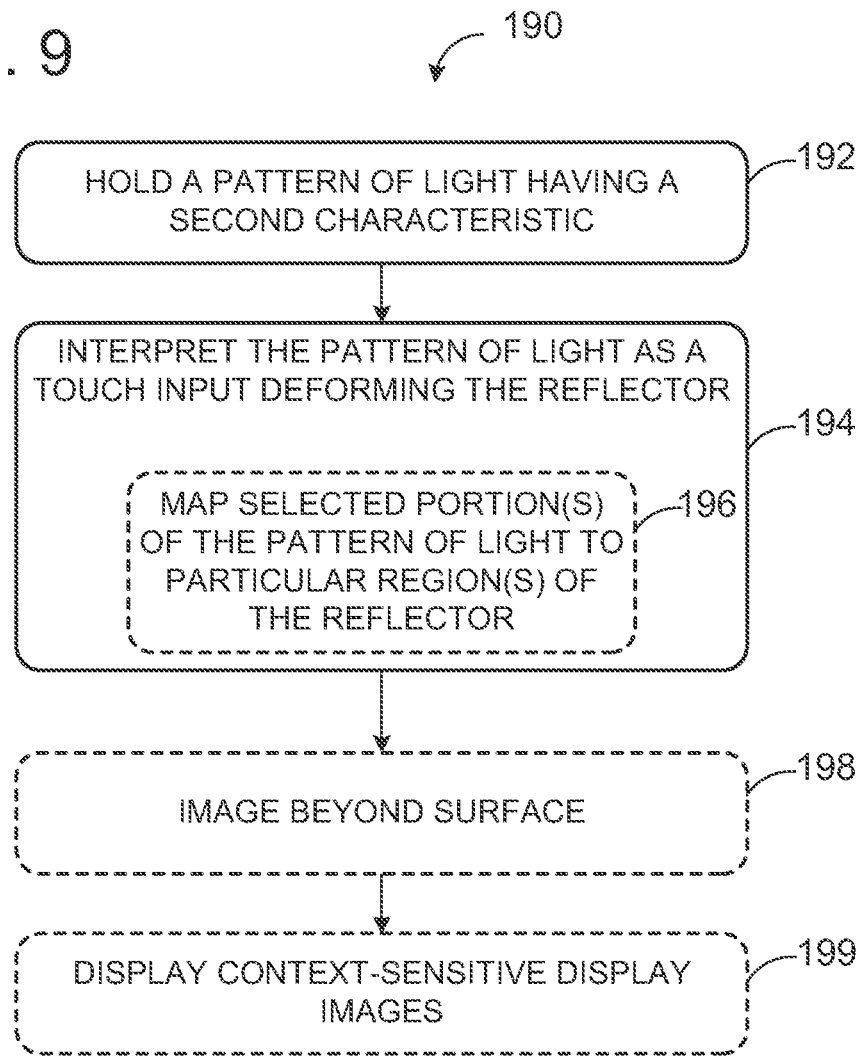
FIG. 9 shows an example method of optical touch detection in accordance with an embodiment of the present disclosure.

Interactive display device 20 may be configured to provide optical detection of touch inputs in any suitable way. FIG. 9 illustrates an example method 190 for detecting touch inputs. Such a method may be carried out by executing instructions stored on the interactive display device. As an example, the interactive display device may include a data-holding subsystem holding such instructions which are executable by a logic subsystem to provide optical touch detection.

Furthermore, the instructions may be configured to characterize the above described patterns of light as a data structure, which may be stored and/or analyzed by a computing device. As one nonlimiting example, a pattern of light received by the sensor 30 may be represented as a matrix including a cell that corresponds to each pixel of the sensor, and each cell may include an intensity value of light detected by the corresponding pixel. As such, the computing system may receive, hold, and/or output a pattern of light as a data structure that is conducive to computer analysis.

At 192, method 190 includes storing a pattern of light having the second characteristic (e.g., as a compatible data structure), as received by the sensor. As introduced above, such a pattern of light may be based on any suitable image detection techniques, such as dark field detection, bright field detection, etc. At 194, method 190 includes interpreting the pattern of light having the second characteristic received by the sensor as a touch input deforming the reflector. Such interpretation may include any suitable image processing techniques, such as mapping a selected portion of the pattern of light to a particular region of the reflector, as indicated at 196. In this way, the touch input may be detected. It should be appreciated that in some embodiments, the pattern may be interpreted into one or more touch inputs (e.g., by mapping one or more selected portions of the pattern of light), without departing from the scope of the disclosure.

In some embodiments, method 190 may further include imaging beyond the surface, as indicated at 198. As described above, light having the first characteristic may be utilized for such imaging. Thus, imaging beyond the surface may include externally illuminating (e.g., illuminating beyond the surface) with light having the first characteristic, and capturing a corresponding pattern of light which may be interpreted as a user's finger, hand, arm, body, etc. hovering above the surface. It should be appreciated that such imaging beyond the surface may be performed in a time-alternating manner with respect to the touch detection (e.g., via time-multiplexing).

Figure 10:
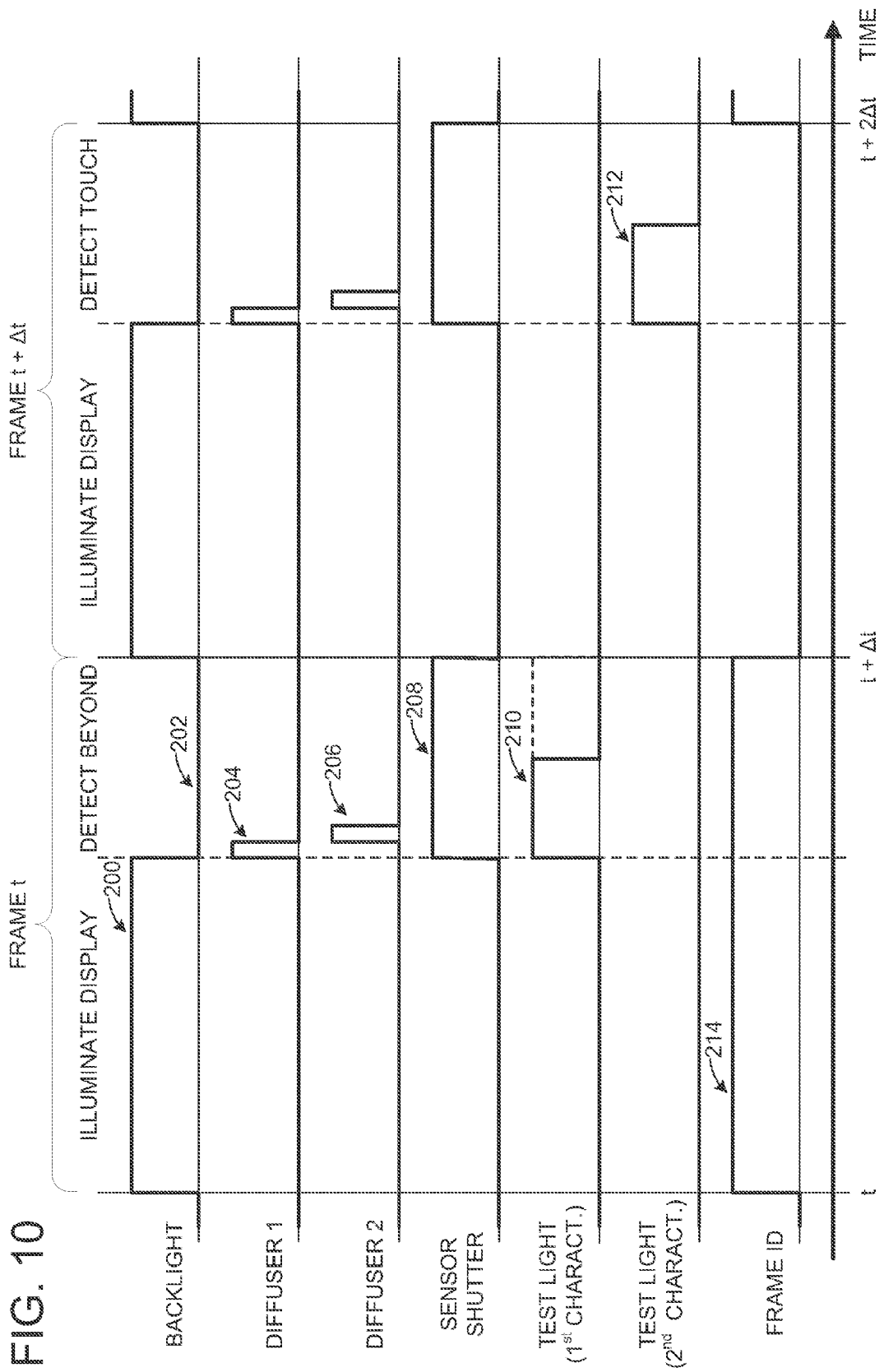
FIG. 10 shows an example timing diagram in accordance with an embodiment of the present disclosure.

FIG. 10 shows an example timing diagram illustrating time-multiplexing for illumination and detection events. The depicted example illustrates two successive frames, each of duration Δt. Frame t represents an "odd" frame, and frame t+Δt represents an "even" frame. As a nonlimiting example, Δt may be approximately 16.7 ms, corresponding to a frame rate of 60 Hz. In this example, a portion of each frame is utilized for illuminating the display, and the other portion of the frame is utilized for detection. More specifically, a portion of the odd frame is utilized for imaging beyond the surface, whereas a portion of the even frame is utilized for touch detection at the surface. In this way, the interactive display device performs display illumination, as well as two different types of detection, in a time-alternating manner, as described in more detail hereafter.

As shown at 200, the first portion of the odd frame and the first portion of the even frame may be utilized for illuminating the display (e.g., with visible light) via a backlight. The latter portion of each frame is then utilized for detection, and thus the display is not illuminated during this time, as illustrated at 202.

A switchable diffuser, such as a PDLC, may be used in a diffusing state while illuminating the display in the first portion of the frame, and then switched to a non-diffusing state while performing detection in the latter portion of the frame, as shown at 204 and 206.

Since detection occurs in the latter portion of each frame, the shutter sensor is timed to be open during this portion of each frame, as shown at 208. In other words, the backlight and the shutter sensor alternate in the time domain. Although the depicted example illustrates the same sensor shutter being used for both detection beyond the surface as well as touch detection at the surface, it should be appreciated that in other embodiments, different sensors may be utilized without departing from the scope of this disclosure.

For the odd frame, detection beyond the surface is performed after illuminating of the display ceases, as indicated at 210. As such, light having the first characteristic (e.g., ~840 nm light) is emitted from a test light source. However, for the even frame, touch detection at the surface is performed after illuminating of the display ceases, as indicated at 212. As such, light having the second characteristic (e.g., ~940 nm light) is emitted from a test light source.

FIG. 10 further illustrates, at 214, a frame ID that may be utilized to enable frame disambiguation (e.g., distinguish odd frames from even frames).

Returning to FIG. 9, at 199, method 190 may optionally include displaying one or more context-sensitive display images on the display based on imaging beyond the surface of the interactive display device. As an example, if it is determined that the user's hand is moving towards the display, then the interactive display device may display user interface objects (e.g., a button), expand a menu, etc. As yet another example, the interactive display device may determine that another user is on the other side of the room, and adjust display images accordingly. It should be appreciated that other types of context-sensitive functionality may additionally or alternatively be employed responsive to imaging beyond the surface. For example, the interactive display device may be configured to support multi-user functionality in which different fingers are identified as corresponding to different users.

In some embodiments, the above described methods and processes may be tied to a computing system including one or more computers. In particular, the methods and processes described herein may be implemented as a computer application, computer service, computer API, computer library, and/or other computer program product.

Figure 11:
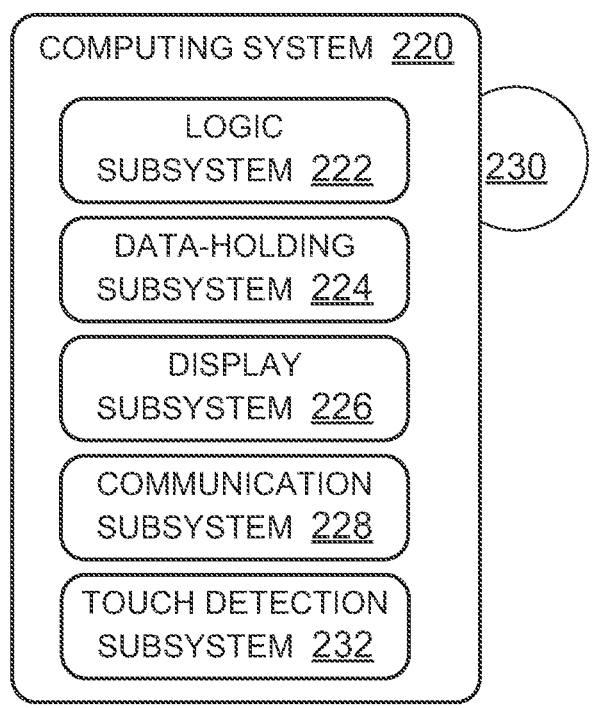
FIG. 11 shows an example computing system in accordance with an embodiment of the present disclosure.

FIG. 11 schematically shows a nonlimiting computing system 220 that may perform one or more of the above described methods and processes. Computing system 220 may include interactive display device 20 of FIG. 1, or interactive display device 20 of FIG. 1 may be a peripheral to the computing system. Computing system 220 is shown in simplified form. It is to be understood that virtually any computer architecture may be used without departing from the scope of this disclosure. In different embodiments, computing system 220 may take the form of a mainframe computer, server computer, desktop computer, laptop computer, tablet computer, home entertainment computer, network computing device, mobile computing device, mobile communication device, gaming device, etc.

Computing system 220 includes a logic subsystem 222 and a data-holding subsystem 224. Computing system 220 may optionally include a display subsystem 226, communication subsystem 228, and/or other components not shown in FIG. 11. Computing system 220 may also optionally include user input devices such as keyboards, mice, game controllers, cameras, microphones, and/or touch screens, for example.

Logic subsystem 222 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 224 may include one or more physical, non-transitory, devices configured to hold data and/or instructions executable by the logic subsystem to implement the herein described methods and processes. When such methods and processes are implemented, the state of data-holding subsystem 224 may be transformed (e.g., to hold different data).

Data-holding subsystem 224 may include removable media and/or built-in devices. Data-holding subsystem 224 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 224 may include devices with one or more of the following characteristics: volatile, nonvolatile, dynamic, static, read/write, read-only, random access, sequential access, location addressable, file addressable, and content addressable. In some embodiments, logic subsystem 222 and data-holding subsystem 224 may be integrated into one or more common devices, such as an application specific integrated circuit or a system on a chip.

FIG. 11 also shows an aspect of the data-holding subsystem in the form of removable computer-readable storage media 230, which may be used to store and/or transfer data and/or instructions executable to implement the herein described methods and processes. Removable computer-readable storage media 230 may take the form of CDs, DVDs, HD-DVDs, Blu-Ray Discs, EEPROMs, and/or floppy disks, among others.

It is to be appreciated that data-holding subsystem 224 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

When included, display subsystem 226 may be used to present a visual representation of data held by data-holding subsystem 224. As the herein described methods and processes change the data held by the data-holding subsystem, and thus transform the state of the data-holding subsystem, the state of display subsystem 226 may likewise be transformed to visually represent changes in the underlying data. Display subsystem 226 may include one or more display devices utilizing virtually any type of technology. Such display devices may be combined with logic subsystem 222 and/or data-holding subsystem 224 in a shared enclosure, or such display devices may be peripheral display devices.

When included, communication subsystem 228 may be configured to communicatively couple computing system 220 with one or more other computing devices. Communication subsystem 228 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 220 to send and/or receive messages to and/or from other devices via a network such as the Internet.

Computing system 220 may further include a touch detection subsystem 232 configured to provide the herein-described optical touch detection. Touch detection subsystem 232 may be configured to coordinate the capturing of patterns of light via a test light source and a sensor. Touch detection subsystem 232 may be further configured to operate with logic subsystem 222 to execute instructions stored on data-holding subsystem 224 for interpreting the patterns of light into one or more input touches and/or objects external to the display.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An interactive display device, comprising:
  an elastomer layer;
  a reflector configured to transmit light having a first characteristic and to reflect light having less than a critical angle of incidence on the reflector and having a second characteristic;
  a display positioned to output modulated light having the first characteristic through the elastomer layer and the reflector as a display image;
  a test light source positioned to output light having the second characteristic through the elastomer layer for reflection off of the reflector;
  a sensor configured to receive light having the second characteristic reflected from the reflector;
  a logic subsystem configured to execute instructions; and
  a data-holding subsystem holding instructions executable by the logic subsystem to interpret a pattern of light having the second characteristic received by the sensor as a touch input deforming the reflector.

2. The interactive display device of claim 1, further comprising a collimating optic positioned to collimate light having the second characteristic received from the test light source and direct collimated light having the second characteristic toward the reflector.

3. The interactive display device of claim 2, wherein the collimating optic is a collimating lens.

4. The interactive display device of claim 2, wherein the collimating optic is a Fresnel lens.

5. The interactive display device of claim 2, wherein the collimating optic is an optical wedge.

6. The interactive display device of claim 1, wherein the instructions are executable to map a selected portion of the pattern of light to a particular region of the reflector.

7. The interactive display device of claim 1, further comprising an optic configured to focus, at the sensor, light having the second characteristic received from one or more regions of the reflector deformed by the touch input, the optic being further configured to focus, at a location proximal to the sensor, light having the second characteristic received from one or more regions of the reflector not deformed by the touch input.

8. The interactive display device of claim 7, wherein the optic is a collimating optic positioned to collimate light having the second characteristic received from the test light source and direct collimated light having the second characteristic toward the reflector.

9. The interactive display device of claim 1, further comprising an optic configured to scatter light having the second characteristic received from one or more regions of the reflector deformed by the touch input, and to focus, at the sensor, light having the second characteristic received from one or more regions of the reflector not deformed by the touch input.

10. The interactive display device of claim 1, wherein the first characteristic corresponds to a first range of wavelengths, and the second characteristic corresponds to a second range of different wavelengths.

11. The interactive display device of claim 10, wherein light having the first characteristic comprises visible light, and light having the second characteristic comprises infrared light.

12. The interactive display device of claim 1, wherein the interactive display device is further configured to output light having the first characteristic beyond a surface of the interactive display device, and wherein the instructions are further executable to image beyond the surface via interpretation of a pattern of light having the first characteristic.

13. The interactive display device of claim 12, wherein light having the first characteristic includes visible light utilized for the display and infrared light having a first wavelength utilized for imaging beyond the surface, and wherein light having the second characteristic includes infrared light having a second wavelength utilized for detection of touch inputs, the second wavelength being greater than the first wavelength.

14. The interactive display device of claim 13, wherein the instructions are further executable to display one or more context-sensitive display images on the display based on imaging beyond the surface of the interactive display device.

15. The interactive display device of claim 1, further comprising a deformable layer configured to receive one or more touch inputs, the deformable layer further comprising a plurality of bumps, each bump configured to, responsive to a touch input, contact and locally deform a region of the reflector.

16. The interactive display device of claim 15, wherein the plurality of bumps are optically matched with the deformable layer.

17. An interactive display device, comprising:
an elastomer layer;
a dichroic reflector configured to transmit visible light and to reflect infrared light having less than a critical angle of incidence on the reflector;
a display positioned to output modulated visible light through the elastomer layer and the dichroic reflector as a display image;
a test light source positioned to output infrared light through the display and the elastomer layer for reflection off of the dichroic reflector;
a sensor configured to receive infrared light reflected from the dichroic reflector; and
an optic configured to focus, at the sensor, infrared light received from one or more regions of the dichroic reflector deformed by one or more touch inputs, the optic being further configured to focus, at a location proximal to the sensor, infrared light received from one or more regions of the dichroic reflector not deformed by one or more touch inputs.

18. The interactive display device of claim 17, wherein the optic is a Fresnel lens.

19. The interactive display device of claim 17, wherein the optic is an optical wedge.

20. An imaging system for detecting touch inputs to an interactive display device via surface deformation, comprising:
an elastomer layer;
a dichroic reflector configured to transmit light having a first characteristic and to reflect light having less than a critical angle of incidence on the reflector and having a second characteristic;
a display positioned to output modulated light having the first characteristic through the elastomer layer and the dichroic reflector as a display image;
a test light source positioned to output light having the second characteristic through the display and the elastomer layer for reflection off of the dichroic reflector;
a sensor configured to receive light having the second characteristic reflected from the dichroic reflector;
a logic subsystem configured to execute instructions; and
a data-holding subsystem holding instructions executable by the logic subsystem to:
store a pattern of light having the second characteristic received by the sensor; and
map one or more selected portions of the pattern of light to one or more particular regions of the dichroic reflector, the one or more particular regions of the dichroic reflector indicating one or more touch inputs deforming the dichroic reflector.

* * * * *